US010634471B2

(12) United States Patent
Kim et al.

(10) Patent No.: US 10,634,471 B2
(45) Date of Patent: Apr. 28, 2020

(54) APPARATUS AND METHOD OF DETERMINING ROLL POSTURE OF PROJECTILE

(71) Applicant: AGENCY FOR DEFENSE DEVELOPMENT, Daejeon (KR)

(72) Inventors: Gyeong Hun Kim, Daejeon (KR); Han Jin Lee, Daejeon (KR); Jae Hyun Choi, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 16/206,502

(22) Filed: Nov. 30, 2018

(65) Prior Publication Data

US 2019/0113317 A1    Apr. 18, 2019

(30) Foreign Application Priority Data

Oct. 18, 2017    (KR) .................. 10-2017-0135245

(51) Int. Cl.
*F42B 10/26*    (2006.01)
*G01K 7/02*    (2006.01)
*F42B 15/08*    (2006.01)

(52) U.S. Cl.
CPC .............. *F42B 10/26* (2013.01); *F42B 15/08* (2013.01); *G01K 7/02* (2013.01)

(58) Field of Classification Search
CPC .......... F42B 10/26; F42B 10/60; F42B 15/08; F42B 19/06
USPC .................................................. 102/425, 427
See application file for complete search history.

(56) References Cited

U.S. PATENT DOCUMENTS

| 2,060,201 | A | * | 11/1936 | Hammond, Jr. | ........ | F42C 13/02 |
| | | | | | | 114/21.2 |
| 3,125,980 | A | * | 3/1964 | Anderson | ................ | B63G 8/42 |
| | | | | | | 114/244 |
| 4,899,956 | A | * | 2/1990 | King | ..................... | F42B 10/661 |
| | | | | | | 102/293 |
| 2013/0126612 | A1 | * | 5/2013 | Durkee | .................. | F42B 15/01 |
| | | | | | | 235/400 |
| 2019/0056202 | A1 | * | 2/2019 | Bortolami | ............. | G01C 21/10 |

FOREIGN PATENT DOCUMENTS

| JP | 5127284 B2 | 1/2013 | |
| JP | 2015-182504 A | 10/2015 | |
| WO | WO-2010141137 A1 * | 12/2010 | ............. F42B 10/60 |

OTHER PUBLICATIONS

Roll Orientation Estimator for Smart Projectiles Using Thermopile Sensors; Rogers et al.; Journal of Guidance Control and Dynamics; Jun. 2011; pp. 688-697.*

* cited by examiner

*Primary Examiner* — Stephen Johnson
(74) *Attorney, Agent, or Firm* — Novick, Kim & Lee, PLLC; Sang Ho Lee

(57) ABSTRACT

An apparatus for determining a roll posture of a projectile includes: at least one thermopile sensor sensing a temperature of a side of the projectile; and a signal processor determining a roll posture of the projectile by using an output signal output as a result of the sensing by the at least one thermopile sensor.

8 Claims, 4 Drawing Sheets

APPARATUS AND METHOD OF DETERMINING ROLL POSTURE OF PROJECTILE

CROSS-REFERENCE TO RELATED APPLICATION

This application claims the priority to Korean Patent Application No. 10-2017-0135245, filed on Oct. 18, 2017, in the Korean Intellectual Property Office, the disclosure of which is incorporated herein in its entirety by reference.

BACKGROUND

1. Field

One or more embodiments relate to apparatuses and methods of determining roll postures of projectiles.

2. Description of the Related Art

All around the world, research has been actively conducted to improve the firepower of shells and munitions. In addition to research for increasing the amount of gunpowder or improving the power of gunpowder to improve the firepower of shells and munitions, research for improving the accuracy of shells and munitions to concentrate firepower has been actively conducted.

An example thereof may be a trajectory correctable munition with a guidance and control function on a shell. As for general shells and munitions, as range increases, accuracy may decrease and dispersion may increase. In order to overcome this limitation, trajectory correctable munitions are being globally developed to increase power by allowing a maximum approach to targets by adding a guidance and control function to shells. A general munition may roll-spin at high speed for flight stability. When a shell uses a tail wing to secure flight stability, the shell may not roll-spin; however, a shell without a tail wing may secure flight stability through a roll-spin. Thus, roll-spinning shells and munitions may need to estimate roll postures for guidance and control. In the case of a guided missile, a roll posture may be measured or estimated through an inertial navigation system; however, in the case of a spin-stabilized munition, due to complex motion during flight, it may be difficult to use an inertial navigation system. As an alternative, research is being conducted into a method of estimating a roll posture by using the strength of received power or by using the phase of a signal received through a global positioning system (GPS). However, the GPS may be disabled by jamming, and the system may be complicated due to the computational complexity of the method described above. As another alternative, research is being conducted into a method of estimating the posture of a shell or munition by measuring a geomagnetic field. For example, in order to increase the power of an air-burst munition, research is being conducted to concentrate the firepower on the ground by detecting the ground. Since the GPS-based system described above is too large to be applied to small munitions, a method based on geomagnetism is being researched instead. However, since geomagnetism changes depending on launch positions, a value of geomagnetism at a launch position may have to be previously inserted into a munition to detect an accurate ground side.

SUMMARY

One or more embodiments include apparatuses and methods of determining roll postures of projectiles.

Additional aspects will be set forth in part in the description which follows and, in part, will be apparent from the description, or may be learned by practice of the presented embodiments.

According to one or more embodiments, an apparatus for determining a roll posture of a projectile includes: at least one thermopile sensor sensing a temperature of a side of the projectile; and a signal processor determining a roll posture of the projectile by using an output signal output as a result of the sensing by the at least one thermopile sensor.

Also, the at least one thermopile sensor may include a first thermopile sensor and a second thermopile sensor that sense temperatures of opposite sides of the projectile, and the signal processor may determine the roll posture of the projectile based on a difference between a first output signal of the first thermopile sensor and a second output signal of the second thermopile sensor.

Also, the signal processor may acquire an output signal with an improved signal-to-noise ratio based on the difference between the first output signal of the first thermopile sensor and the second output signal of the second thermopile sensor.

Also, the apparatus may further include a gyro sensor measuring a roll angular velocity of the projectile, wherein the signal processor may determine the roll posture of the projectile based on the output signal and the measured roll angular velocity.

Also, the signal processor may determine a roll angle and a roll angular velocity of the projectile based on an equation below $$\begin{bmatrix} \theta \\ \dot{\theta} \end{bmatrix}_{k+1} = \begin{bmatrix} 1 & \Delta T \\ 0 & 1 \end{bmatrix} \begin{bmatrix} \theta \\ \dot{\theta} \end{bmatrix}_{k}$$

where $\theta$ may denote the roll angle, $\dot{\theta}$ may denote the roll angular velocity measured by the gyro sensor, $\Delta T$ may denote a sampling time, and subscripts k and k+1 may respectively denote a current time and a next time.

Also, the signal processor may determine a spin number of the projectile by using the output signal.

Also, the signal processor may determine at least one of a roll direction, a roll angle, and a roll angular velocity of the projectile by using the output signal.

According to one or more embodiments, a projectile includes: at least one thermopile sensor sensing a temperature of a side of the projectile; and a signal processor determining a roll posture of the projectile by using an output signal output as a result of the sensing by the at least one thermopile sensor.

Also, the projectile may include a spin-stabilized munition.

According to one or more embodiments, a method of determining a roll posture of a projectile includes: sensing a temperature of a side of the projectile by using a thermopile sensor; and determining a roll posture of the projectile by using an output signal output as a result of the sensing.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
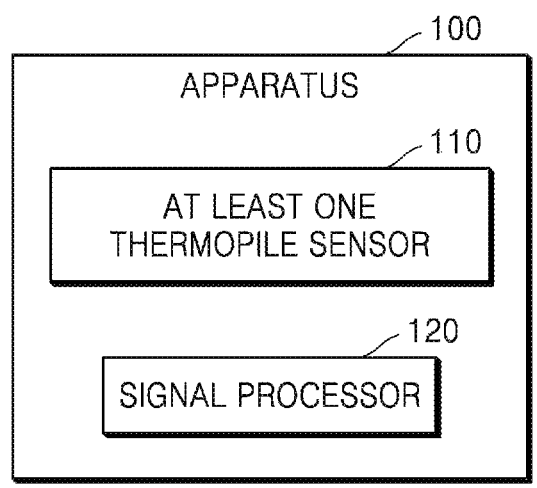
FIG. 1 illustrates a block diagram of an apparatus for determining a roll posture of an projectile, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail merely as examples with reference to the accompanying drawings. It is to be understood that the following embodiments are merely intended to illustrate the technical details and are not intended to limit the scope of the present disclosure. Those that may be easily derived from the detailed description and the embodiments by those of ordinary skill in the art should be construed as falling within the scope of the present disclosure.

In this specification, when an element is referred to as being "connected" to another element, it may be "directly connected" to the other element or may be "connected" to the other element with one or more intervening elements therebetween. Also, when something is referred to as "including" one or more components, it may further include one or more other components unless specified otherwise.

Also, although terms including ordinals such as "first" or "second" may be used herein to describe various elements or components, these elements or components should not be limited by these terms. These terms are only used to distinguish one element or component from another element or component.

FIG. 1 illustrates a block diagram of an apparatus for determining a roll posture of an projectile, according to an embodiment.

An apparatus 100 for determining a roll posture of a projectile (hereinafter, referred to as apparatus 100 for convenience of description) may include at least one thermopile sensor 110 and a signal processor 120. Only components related to the present embodiment are illustrated in the apparatus 100 illustrated in FIG. 1. Thus, those of ordinary skill in the art will understand that other general-purpose components may be further included in addition to the components illustrated in FIG. 1.

The at least one thermopile sensor 110 may sense a temperature of a side of the projectile. A thermopile sensor is a sensor that senses heat by using the Seebeck effect that generates a voltage when two different types of semiconductors have a temperature difference.

According to an embodiment, the apparatus 100 may be included in the projectile. In this case, since the side of the projectile may be a ground side or a sky side as the projectile spins, the at least one thermopile sensor 110 may sense a temperature of the ground side or the sky side with respect to the projectile. The at least one thermopile sensor 110 may output a voltage signal resulting from the sensing as an output signal. Since thermal radiation energy decreases as the distance from a heat source increases, the ground has higher thermal radiation energy than the sky. Thus, as the projectile spins, the at least one thermopile sensor 110 may sequentially sense the temperatures of the ground side and the sky side and the output signal of the at least one thermopile sensor 110 may be a sinusoidal signal. Particularly, the output signal may be a sinusoidal signal having the temperature of the ground side as the maximum value and having the temperature of the sky side as the minimum value.

According to an embodiment, the at least one thermopile sensor 110 may include a first thermopile sensor and a second thermopile sensor that sense temperatures of different sides of the projectile. Also, the signal processor 120 may determine the roll posture of the projectile based on a difference between a first output signal of the first thermopile sensor and a second output signal of the second thermopile sensor.

The signal processor 120 may determine the roll posture of the projectile by using the output signal that is output as a result of sensing by the at least one thermopile sensor 110. The roll posture of the projectile may represent a spin direction, a spin number (the number of spins), a roll angle, and a roll angular velocity of the projectile. Also, the signal processor 120 may amplify and filter the output signal of the at least one thermopile sensor 110.

According to an embodiment, the signal processor 120 may determine the spin number of the projectile by measuring a cycle number (the number of cycles) of the output signal of the at least one thermopile sensor 110. Particularly, since the temperatures sensed by the at least one thermopile sensor 110 may repeat whenever the projectile spins, the cycle number of the output signal and the spin number of the projectile may coincide with each other. Also, the signal processor 120 may determine the ground side with respect to the projectile by detecting the maximum value generation time of the at least one thermopile sensor 110. Particularly, since the output signal of the at least one thermopile sensor 110 may have a maximum value when the at least one thermopile sensor 110 senses the temperature of the ground side, the signal processor 120 may determine the ground side with respect to the projectile by detecting the maximum value generation time of the at least one thermopile sensor 110. Likewise, the signal processor 120 may determine the sky side with respect to the projectile by detecting the minimum value generation time of the at least one thermopile sensor 110.

According to an embodiment, the signal processor 120 may determine the roll angle or the roll angular velocity of the projectile by using the output signal of the at least one thermopile sensor 110. First, the signal processor 120 may determine the time per spin cycle of the projectile based on the time per cycle of the output signal. Also, the signal processor 120 may determine the roll angular velocity of the projectile based on the determined time per spin cycle of the projectile (i.e., the time taken to spin 360 degrees). Also, as described above, the signal processor 120 may determine the sky side or the ground side with respect to the projectile. In this case, the signal processor 120 may determine the roll angle spun from the sky side or the ground side by using the measured time and the roll angular velocity of the projectile.

Figure 2:
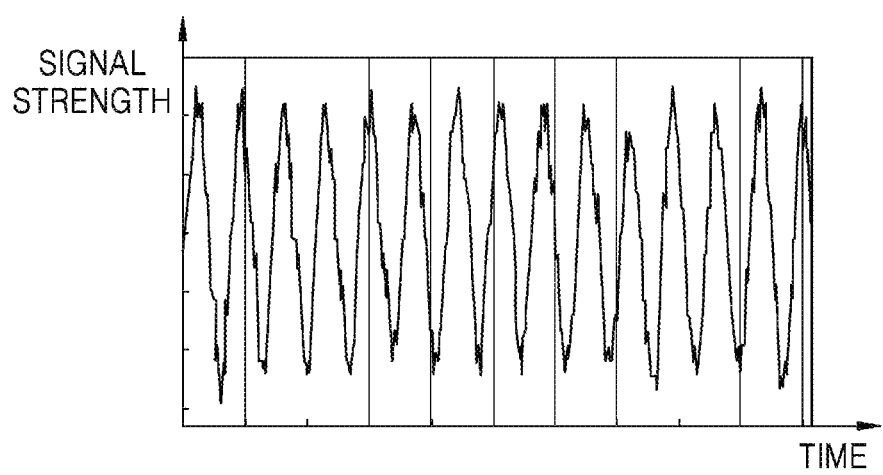
FIG. 2 illustrates an embodiment of an output signal of a thermopile sensor.

FIG. 2 illustrates an embodiment of an output signal of a thermopile sensor.

As illustrated in FIG. 2, the at least one thermopile sensor 110 may output an output signal as a sine wave. Particularly, the output signal may be a sinusoidal signal having a maximum value when the at least one thermopile sensor 110 senses the ground side and having a minimum value when the at least one thermopile sensor 110 senses the sky side.

Figure 3:
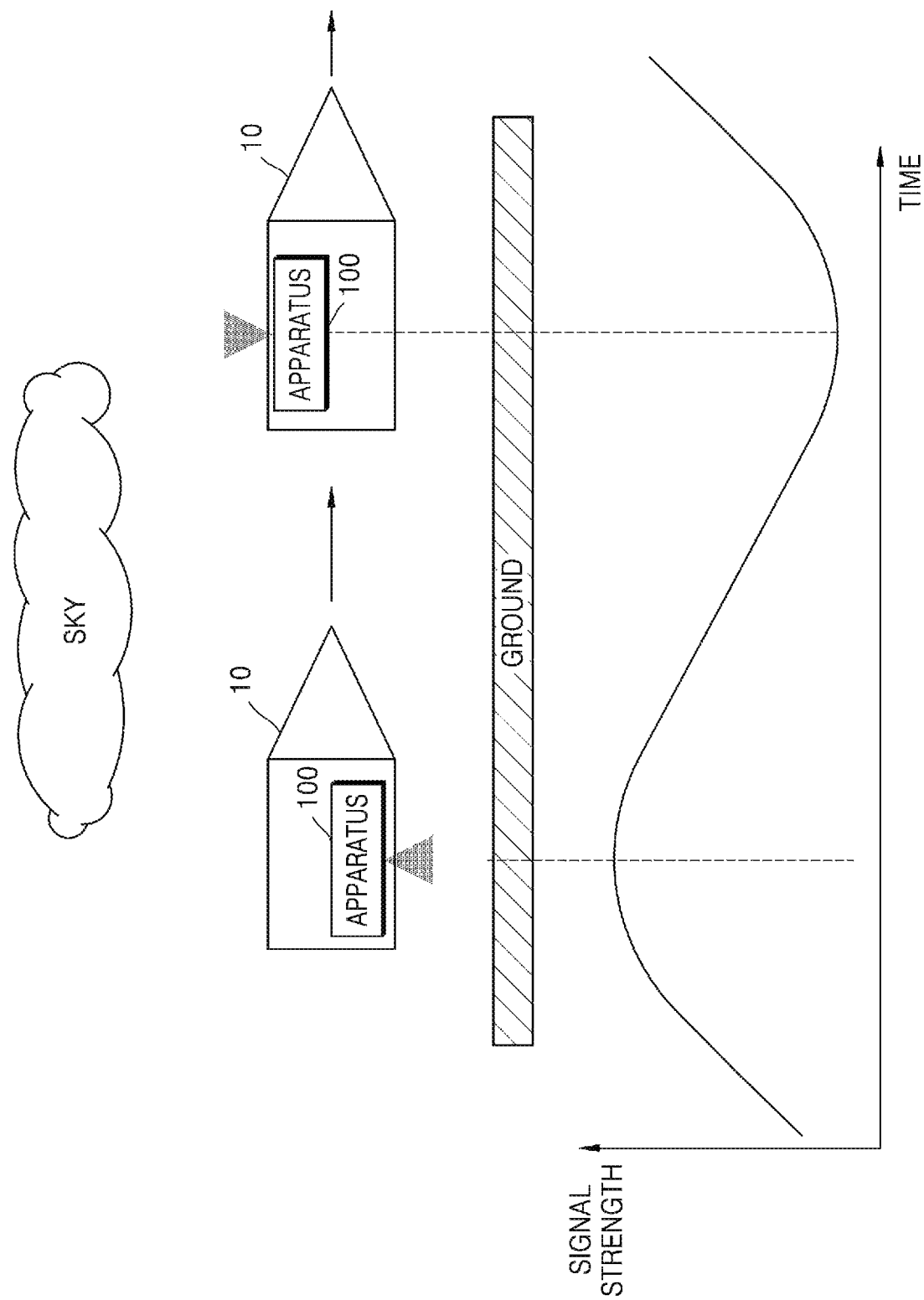
FIG. 3 illustrates a projectile according to an embodiment.

FIG. 3 illustrates a projectile according to an embodiment.

A projectile 10 may include an apparatus 100 for determining a roll posture of the projectile 10. The projectile 10 may include a shell or munition. Also, the projectile 10 may include a spin-stabilized munition.

The projectile 10 may progress spinning. Thus, the apparatus 100 in the projectile 10 may sense the temperature of the side of the projectile 10 as the projectile 10 spins. Also, as illustrated in FIG. 3, the apparatus 100 may output a sine wave, which has the temperature sensed when the apparatus 100 faces the ground side as a maximum value and has the temperature sensed when the apparatus 100 faces the sky side as a minimum value, as an output signal.

Also, the apparatus 100 may determine the roll posture of the projectile 10 by using the output signal. Particularly, as described with reference to FIG. 1, the apparatus 100 may determine at least one of the spin direction, the spin number, the roll angle, and the roll angular velocity of the projectile 10 by using the output signal.

Figure 4:
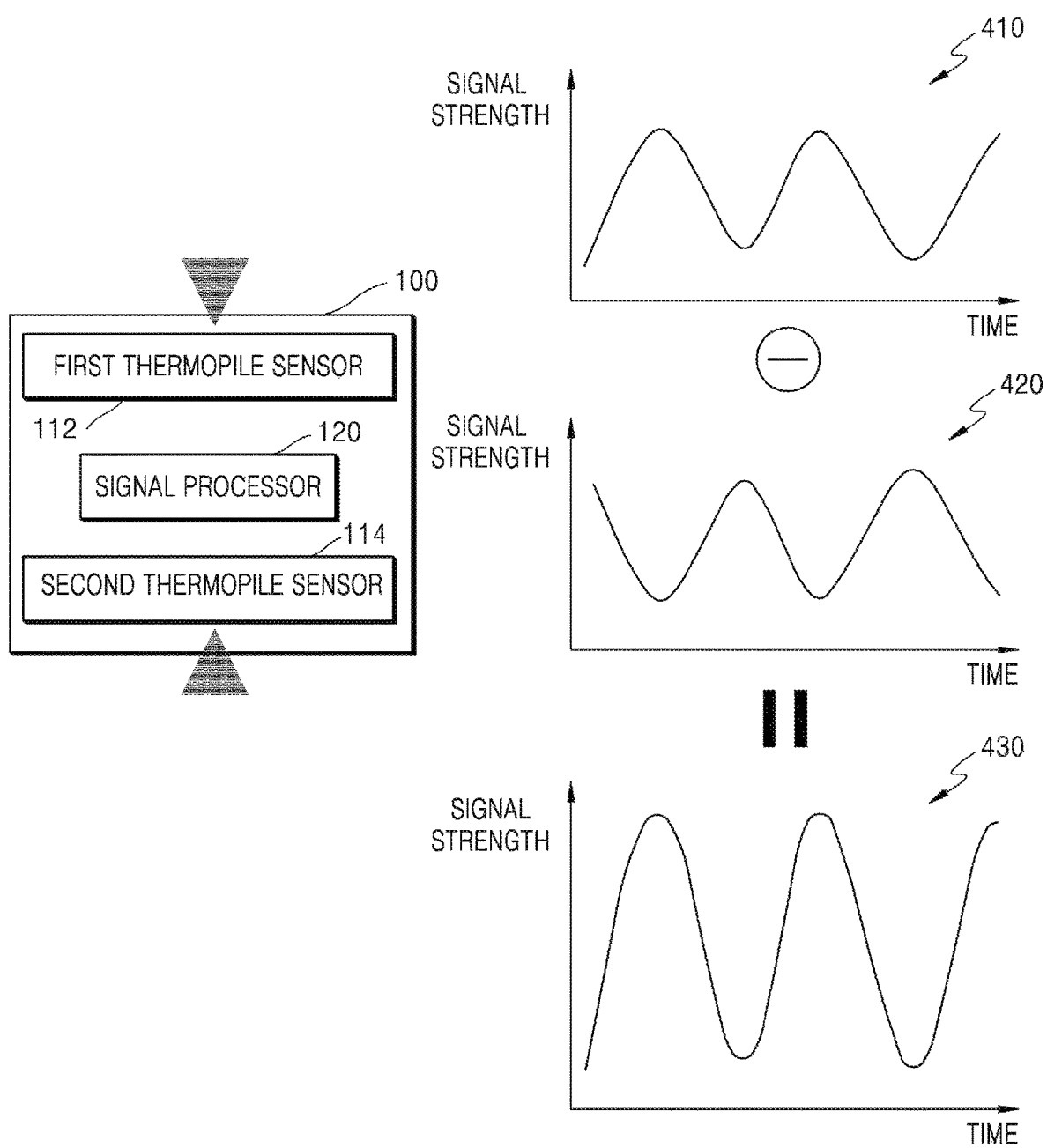
FIG. 4 illustrates a block diagram of an apparatus according to another embodiment.

FIG. 4 illustrates a block diagram of an apparatus according to another embodiment.

According to an embodiment, an apparatus 100 may include a first thermopile sensor 112, a second thermopile sensor 114, and a signal processor 120.

The first thermopile sensor 112 and the second thermopile sensor 114 may sense the temperatures of the opposite sides of the projectile. Particularly, when the first thermopile sensor 112 senses the temperature of the ground side of the projectile, the second thermopile sensor 114 may sense the temperature of the sky side of the projectile. On the other hand, when the first thermopile sensor 112 senses the temperature of the sky side of the projectile, the second thermopile sensor 114 may sense the temperature of the ground side of the projectile. Thus, the first thermopile sensor 112 and the second thermopile sensor 114 may be structurally included in the projectile so as to face the ground side and the sky side of the projectile.

Since the first thermopile sensor 112 and the second thermopile sensor 114 sense the temperatures of the opposite sides of the projectile, the output signals of the first thermopile sensor 112 and the second thermopile sensor 114 may have a phase difference of 180 degrees therebetween. According to an embodiment, as illustrated in FIG. 4, the output signal of the first thermopile sensor 112 may appear as a graph 410 and the output signal of the second thermopile sensor 114 may appear as a graph 420.

The signal processor 120 may determine the roll posture of the projectile based on a difference between the output signal of the first thermopile sensor 112 and the output signal of the second thermopile sensor 114.

Particularly, the signal processor 120 may acquire an output signal having an improved signal-to-noise ratio by calculating the difference between the output signal of the first thermopile sensor 112 and the output signal of the second thermopile sensor 114. Since a thermopile sensor is a sensor that measures faint heat, the signal strength thereof may be low. Accordingly, it may be vulnerable to noise such as thermal noise generated in the circuit. Thus, since the output signals of the first thermopile sensor 112 and the second thermopile sensor 114 facing in opposite directions are signals having a phase difference of 180 degrees therebetween, the signal processor 120 may acquire an output signal having an improved signal-to-noise ratio by calculating the difference between the two signals. According to an embodiment, the signal processor 120 may acquire an output signal corresponding to a graph 430 by calculating the difference between the output signal of the first thermopile sensor 112 corresponding to the graph 410 and the output signal of the second thermopile sensor 114 corresponding to the graph 420.

Figure 5:
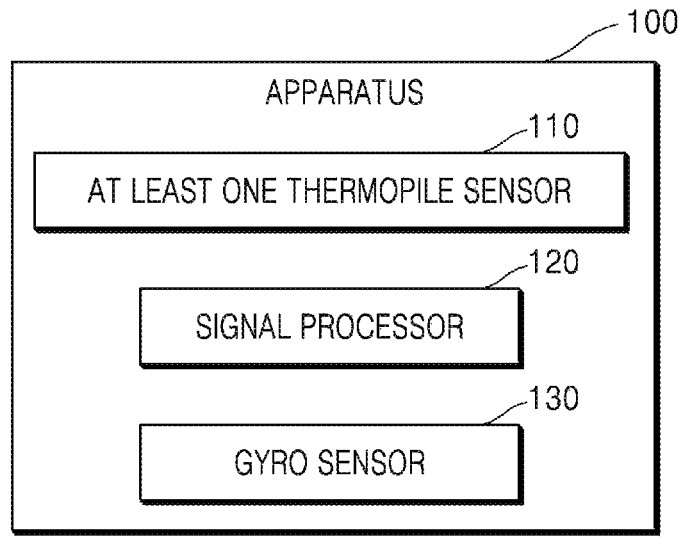
FIG. 5 illustrates a block diagram of an apparatus according to another embodiment.

FIG. 5 illustrates a block diagram of an apparatus according to another embodiment.

The apparatus 100 may further include a gyro sensor 130.

The gyro sensor 130 may measure the roll angular velocity of the projectile.

The signal processor 120 may determine the roll posture of the projectile based on the output signal of the at least one thermopile sensor 110 and the roll angular velocity measured by the gyro sensor 130.

According to an embodiment, the signal processor 120 may determine the roll angle and the roll angular velocity of the projectile based on Equation 1 below.

$$\begin{bmatrix} \theta \\ \dot{\theta} \end{bmatrix}_{k+1} = \begin{bmatrix} 1 & \Delta T \\ 0 & 1 \end{bmatrix} \begin{bmatrix} \theta \\ \dot{\theta} \end{bmatrix}_k \qquad \text{Equation 1}$$

In Equation 1, $\theta$ denotes the roll angle, $\dot{\theta}$ denotes the roll angular velocity, $\Delta T$ denotes a sampling time, and subscripts k and k+1 respectively denote a current time and a next time. According to an embodiment, the signal processor 120 may calculate the roll angle at the current time by using the at least one thermopile sensor 110 and may use the roll angular velocity measured by the gyro sensor 130 as the roll angular velocity at the current time. Also, since the roll angular velocity of the projectile spinning at high speed may not greatly change, the signal processor 120 may use the roll angular velocity at the current time as the roll angular velocity at the next time.

Figure 6:
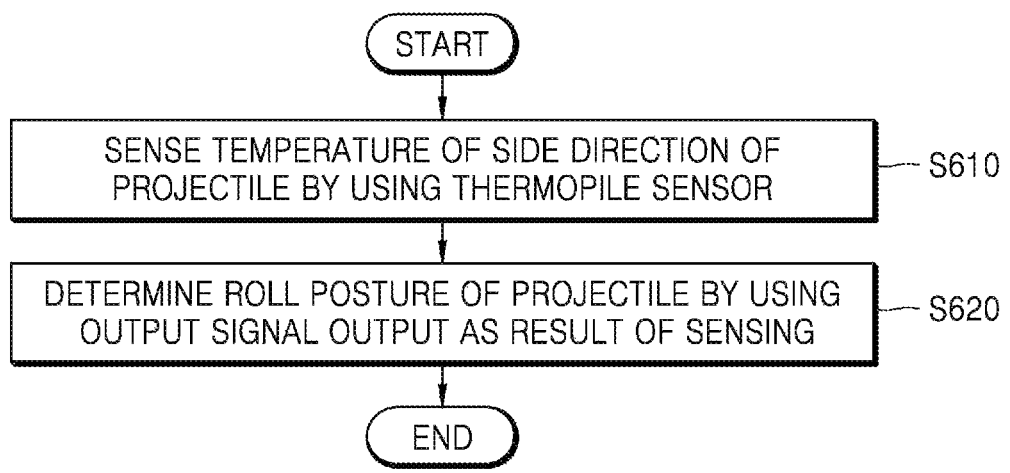
FIG. 6 illustrates a method of determining a roll posture of a projectile, according to an embodiment.

FIG. 6 illustrates a method of determining a roll posture of a projectile, according to an embodiment.

The method illustrated in FIG. 6 may be performed by each component of the apparatus 100 of FIGS. 1 to 5, and thus redundant descriptions thereof will be omitted for conciseness.

In operation S610, the apparatus 100 may sense the temperature of the side of the projectile by using the thermopile sensor. The apparatus 100 may output a voltage signal resulting from the sensing as an output signal. Also, the apparatus 100 may sense the temperatures of the opposite sides of the projectile by using the thermopile sensors.

In operation S620, the apparatus 100 may determine the roll posture of the projectile by using the output signal that is output as a result of the sensing in operation S610. Also, the apparatus 100 may determine the roll posture of the projectile by using the output signals sensed in the opposite sides of the projectile. The apparatus 100 may generate an output signal having an improved signal-to-noise ratio based on the difference between the output signals sensed in the opposite sides of the projectile.

The present embodiment may be described in terms of functional block components and various processing operations. Such functional blocks may be implemented by any number of hardware and/or software components that execute particular functions. For example, the embodiment may employ various integrated circuit (IC) components, such as memory components, processing components, logic components, and look-up tables, which may execute various functions under the control of one or more microprocessors or other control devices. Similarly, where components may be implemented by software programming or software elements, the present embodiment may be implemented by any programming or scripting language such as C, C++, Java, or assembly language, with various algorithms being implemented by any combination of data structures, processes, routines, or other programming components. Functional aspects may be implemented by an algorithm that is executed in one or more processors. Also, the present embodiment may employ the related art for electronic environment setting, signal processing, and/or data processing. Terms such as "mechanism", "element", "unit", and "configuration" may be used in a broad sense, and are not limited to mechanical and physical configurations. The terms may include the meaning of software routines in conjunction with processors or the like.

Also, the terms "units" and "modules" used herein may refer to units that perform at least one function or operation, and the units may be implemented as hardware or software or a combination of hardware and software.

Particular implementations described in the present embodiment are merely examples, and do not limit the scope of the present disclosure in any way. For the sake of conciseness, descriptions of related art electronic configurations, control systems, software, and other functional aspects of the systems may be omitted. Also, the connection lines or connection members between various components illustrated in the drawings represent examples of functional connections and/or physical or logical connections between the various components, and various alternative or additional functional connections, physical connections, or logical connections may be present in practical apparatuses.

The use of the terms "a", "an", and "the" and similar referents in the context of the specification (especially in the context of the following claims) may be construed to cover both the singular and the plural. Also, recitation of a range of values herein are merely intended to serve as a shorthand method of referring individually to each separate value falling within the range, unless otherwise indicated herein, and each separate value is incorporated into the specification as if it was individually recited herein. Also, the operations of the method described herein may be performed in any suitable order unless otherwise indicated herein or otherwise clearly contradicted by the context. The method is not limited to the described order of the method. All examples or illustrative terms (e.g., "such as") provided herein are merely intended to describe the technical concept of the present disclosure in detail, and the scope of the present disclosure is not limited by the examples or illustrative terms unless otherwise defined in the following claims. Also, those of ordinary skill in the art will readily understand that various modifications and combinations may be made according to design conditions and factors without departing from the spirit and scope of the present disclosure as defined by the following claims.

According to the present embodiment determining the roll posture of the projectile by using the thermopile sensor, it may be applied to complex ballistic motion, there may be no signal distortion caused by jamming or peripheral devices, and the amount of calculations thereof may be much smaller than that of a GPS-based roll estimation method. Also, since the temperatures of different sides of the projectile are sensed, the output signal of the thermopile sensor having an improved signal-to-noise ratio may be generated. Also, since the gyro sensor is used together, the roll angle and the roll angular velocity of the projectile may be determined more accurately.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus for determining a roll posture of a projectile that flies spinning, the apparatus comprising:
a first thermopile sensor configured to sense a first temperature of a first side of the projectile;
a second thermopile sensor configured to sense a second temperature of a second side of the projectile, the second side being placed opposite to the first side; and
a signal processor configured to determine the roll posture of the projectile by using a first output signal of the first thermopile sensor and a second output signal of the second thermopile sensor,
wherein the signal processor acquires an amplified output signal by subtracting the second output signal of the second thermopile sensor from the first output signal of the first thermopile sensor and determines the roll posture of the projectile by using the amplified output signal.

2. The apparatus of claim 1, further comprising a gyro sensor configured to measure a roll angular velocity of the projectile,
wherein the signal processor determines the roll posture of the projectile based on the amplified output signal and the measured roll angular velocity.

3. The apparatus of claim 2, wherein the signal processor determines a roll angle of the projectile based on an equation below $$\begin{bmatrix} \theta \\ \dot{\theta} \end{bmatrix}_{k+1} = \begin{bmatrix} 1 & \Delta T \\ 0 & 1 \end{bmatrix} \begin{bmatrix} \theta \\ \dot{\theta} \end{bmatrix}_k$$

where $\theta$ denotes the roll angle, $\dot{\theta}$ denotes the roll angular velocity measured by the gyro sensor, $\Delta T$ denotes a sampling time, and subscripts k and k+1 respectively denote a current time and a next time.

4. The apparatus of claim 1, wherein the signal processor determines a spin number of the projectile by using the amplified output signal.

5. The apparatus of claim 1, wherein the signal processor determines at least one of a roll direction, a roll angle, or a roll angular velocity of the projectile by using the amplified output signal.

6. A projectile configured to fly spinning, the projectile comprising:

a first thermopile sensor configured to sense a first temperature of a first side of the projectile;

a second thermopile sensor configured to sense a second temperature of a second side of the projectile, the second side being placed opposite to the first side; and a signal processor configured to determine the roll posture of the projectile by using a first output signal of the first thermopile sensor and a second output signal of the second thermopile sensor, wherein the signal processor acquires an amplified output signal by subtracting the second output signal of the second thermopile sensor from the first output signal of the first thermopile sensor and determines the roll posture of the projectile by using the amplified output signal.

7. The projectile of claim 6, wherein the projectile comprises a spin-stabilized munition.

8. A method of determining a roll posture of a projectile that flies spinning, the method comprising:

sensing a first temperature of a first side of the projectile;

sensing a second temperature of a second side of the projectile, the second side being opposite to the first side; and determining the roll posture of the projectile by using a first output signal of a first thermopile sensor and a second output signal of a second thermopile sensor, wherein the determining the roll posture of the projectile includes acquiring an amplified output signal by subtracting the second output signal of the second thermopile sensor from the first output signal of the first thermopile sensor and determining the roll posture of the projectile by using the amplified output signal.

* * * * *